UNITED STATES PATENT OFFICE.

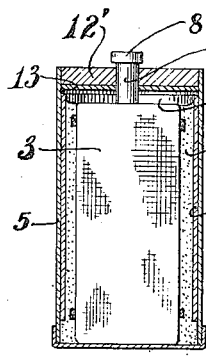
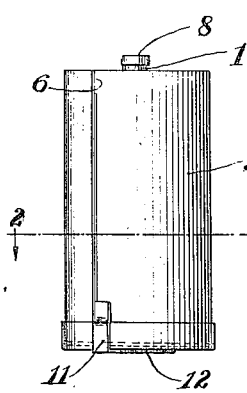
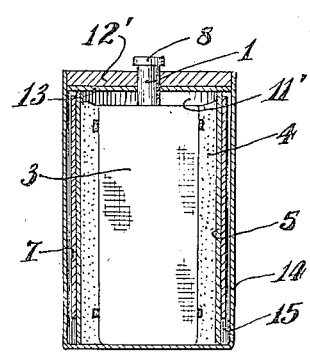
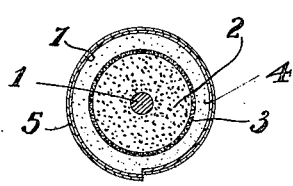
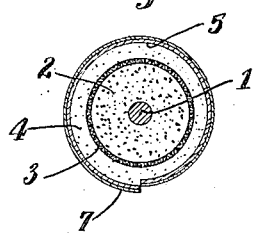
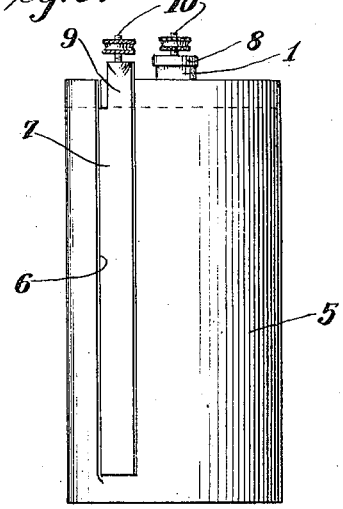
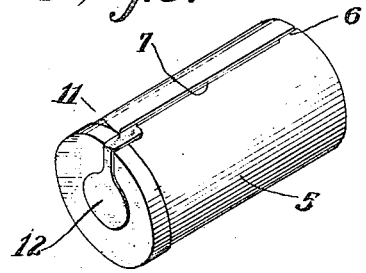
INVENTOR
John Smith
ATTORNEY

JOHN SMITH, OF BROOKLYN, NEW YORK.

BATTERY.

1,402,185.  Specification of Letters Patent.  Patented Jan. 3, 1922.

Application filed March 20, 1919. Serial No. 283,729.

*To all whom it may concern:*

Be it known that I, JOHN SMITH, a citizen of the United States, and resident of the borough of Brooklyn, county of Kings, city and State of New York, have invented certain new and useful Improvements in Batteries, of which the following is a specification.

This invention relates to improvements in primary electric batteries and has for its principal object the provision of a battery of the type known as the dry cell in which it is possible to render the same active or inactive at the desire of the user.

It has been a well known fact that the ordinary type of dry cell deteriorates when not in actual use, due to the chemical action of the electrolyte on the zinc plate and as a means to avoid such waste this invention contemplates the construction of a battery in which it is possible to remove the zinc plate from contact with the electrolyte at will.

A further object of the invention is to provide a battery of the dry cell type which is designed for use either in connection with the ordinary flashlight or for other purposes.

A still further object of the invention resides in the provision of a battery having an air space in its upper end for the accommodation of gases formed when said battery is active.

The following is what I consider the best means of carrying out this invention and the accompanying drawings should be referred to for a complete understanding of the specification which follows.

In the drawings:—

Fig. 1, is a side view in elevation of a battery constructed in accordance with this invention illustrating the same in active position.

Fig. 2, is a horizontal sectional view taken on line 2—2 of Fig. 1.

Fig. 3, is a vertical sectional view through Figure 1.

Fig. 4, is a horizontal sectional view through Figure 1 illustrating a battery in inactive position.

Fig. 5 is a perspective view of Figure 1 illustrating in detail the bottom contact.

Fig. 6, is a side view in elevation similar to Figure 1 illustrating a battery having terminals at its upper end and Fig. 7, is a vertical sectional view through a battery illustrating the device when constructed with an outer shell or casing for protecting the zinc plate when in inactive position.

Similar reference numerals indicate like parts in all of the figures where they appear.

Referring to the drawing in detail the numeral 1 designates the carbon element of the battery which is surrounded with the usual depolarizing agent or black mass 2 which is covered with a fabric or porous covering 3 and fits into the outer shell or housing 5 which is preferably constructed of paraffined or otherwise waterproofed paper or cardboard. The electrolyte is 4 inserted between the covering 3 and shell 5 so as to contact with the zinc plate to be more fully described. The shell 5 is provided with a bottom and has a longitudinal slit 6 formed therein through which the zinc plate slides.

The zinc plate is designated by the numeral 7 and is bent into the form shown so as to lay around the shell 5 when the cell is inactive as clearly shown in Figure 4. When the cell is rendered active however, the zinc plate 7 is turned so it enters the slit 6 and completely encloses the covering 3 thus bringing the zinc plate into contact with the electrolyte and rendering the cell active.

In order that the power generated within the cell may be utilized the carbon rod 1 may be provided with a contact cap 8 and the zinc plate with an arm 9 each of which is provided with the usual binding post 10 as shown in Fig. 6. Or if the cell is of the type used for flashlights an arm 11 may be formed on the zinc plate 7 and bent around the bottom of the cell, terminating in a contact element 12.

In order to accommodate any gases generated within the cell due to the action of the electrolyte on the carbon and zinc elements an air space 11 is formed between the upper end of the fabric covering 3 and the under side of the sealing element 12 which sealing element is supported on a disk 13 formed of paper, cardboard or the like.

In the form of the device illustrated in Figure 7 it will be noted that the battery consists of essentially the same elements as previously described but differs in that the zinc plate 7 when lying on the outer side of the shell 5 and in inactive position is completely enclosed and protected by a housing 14 which is connected to the bottom of the battery in any preferred manner. In this construction it will be noted that the disk 13 rests upon the upper edge of the shell 5 and that in addition to the air space 11 a space 15 is formed between the shell 5 and housing 14 into which the zinc plate slides when the cell is inactive.

From the foregoing it will be evident that after a battery has been manufactured it may be set upon a shelf indefinitely without fear of deterioration. As soon as it is desired to render the same active the zinc plate 7 is turned into the slit 6 thus assembling the elements into co-operative relation. It will be further seen that if so desired a new zinc plate 7 may be substituted after the former has been consumed, thus increasing the life of the cell indefinitely.

Modifications may be made within the scope of the appended claims without departing from or sacrificing the advantages of the invention.

Having carefully and fully described my invention what I claim and desire to secure by Letters Patent is:

1. A primary battery of the dry cell type including a stationary electrode and an electrolyte surrounding the stationary electrode, a shell for enclosing the electrode and electrolyte and a movable electrode normally lying against the exterior of the battery and adapted to be moved through an opening in the battery casing into contact with the electrolyte to render the cell active.

2. A primary battery of the dry cell type including a stationary electrode and electrolyte surrounding the stationary electrode, a slotted shell encasing the electrode and electrolyte and a movable electrode adapted to be inserted through the slot into contact with the electrolyte to render the cell active and to be withdrawn through said slot to render the cell inactive.

3. A primary battery of the dry cell type including a stationary electrode and electrolyte surrounding said electrode, a slotted housing for encasing the electrode and electrolyte, a movable electrode adapted to be brought into contact with the electrolyte by entrance through the slot to thereby render the cell active, said movable electrode also being adapted to be withdrawn from contact with the electrolyte to render the cell inactive and sealing means to retain the electrolyte within the cell.

4. A primary battery of the dry cell type, a stationary electrode, an electrolyte surrounding said electrode, a non-porous and non-conducting shell encasing the electrode and electrolyte, sealing means for retaining the electrolyte and stationary electrode within the shell, the said shell having a slot in the side thereof, a movable electrode surrounding the shell when the battery is inactive and adapted to be turned into the shell through the slot and into contact with the electrolyte to render the battery active.

5. A primary battery of the dry cell type, a stationary electrode, an electrolyte surrounding said stationary electrode, a non-porous and non-conducting slotted shell for encasing the electrode and electrolyte, a movable electrode surrounding the shell and adapted to be entered through the slot therein to render the device active and a housing enclosing the whole to protect the movable electrode to render the battery inactive.

6. A primary battery of the dry cell type comprising a slotted non-porous shell, a central electrode with the shell, an electrolyte surrounding the electrode, and an external movable electrode adapted to be inserted through the slot to completely surround the central electrode, and render the battery active, said movable electrode being capable of being withdrawn through the slot to render battery inactive.

7. A battery of the dry cell type comprising a central electrode, a slotted non-porous, non-conducting shell surrounding the central electrode and spaced therefrom, means for sealing the central electrode in place, an electrolyte surrounding the central electrode and disposed between the electrode and the shell, a substantially cylindrical electrode mounted in the exterior of the shell and adapted to be turned so that one edge enters the slot in the shell to render the battery active, said last named electrode being adapted to be withdrawn to render the battery inactive.

Signed at N. Y. City this 12 day of March 1919.

JOHN SMITH.